Feb. 16, 1960　　　N. V. SEM ET AL　　　2,924,998
DIFFERENTIAL GEAR REDUCER
Filed Dec. 31, 1954　　　　　　　　　　　　2 Sheets-Sheet 1
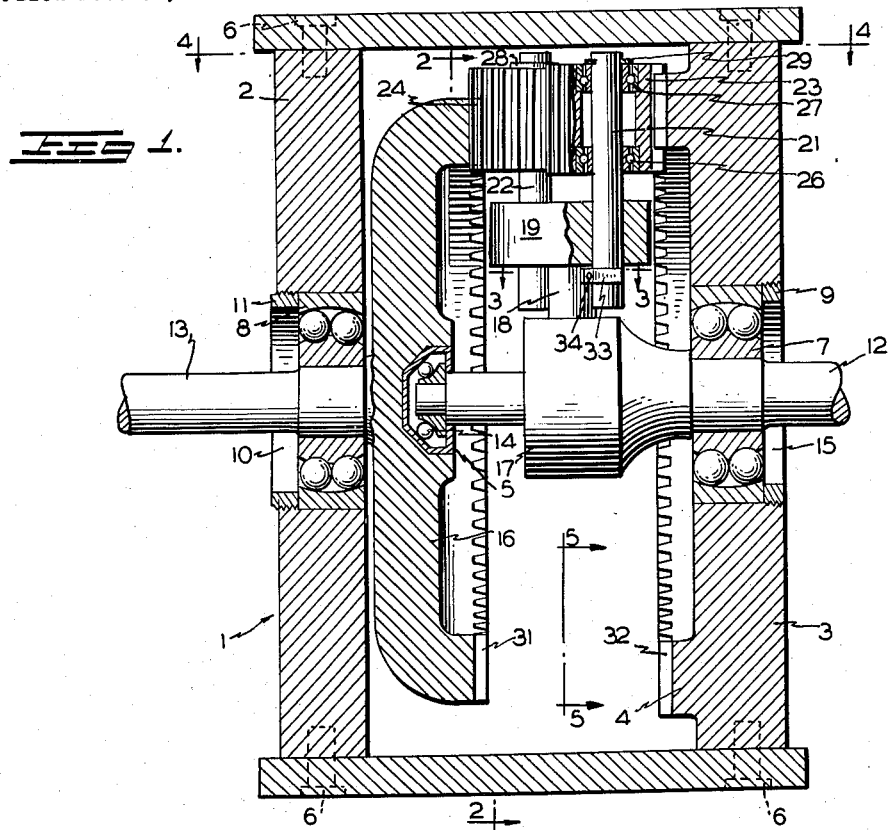
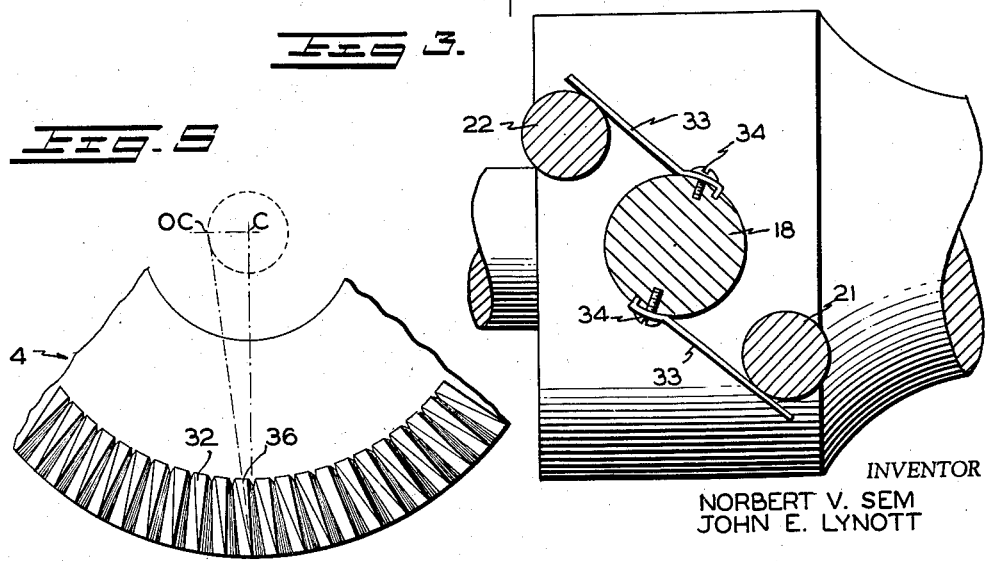
INVENTOR
NORBERT V. SEM
JOHN E. LYNOTT
BY *G. L. De Mott*
ATTORNEY

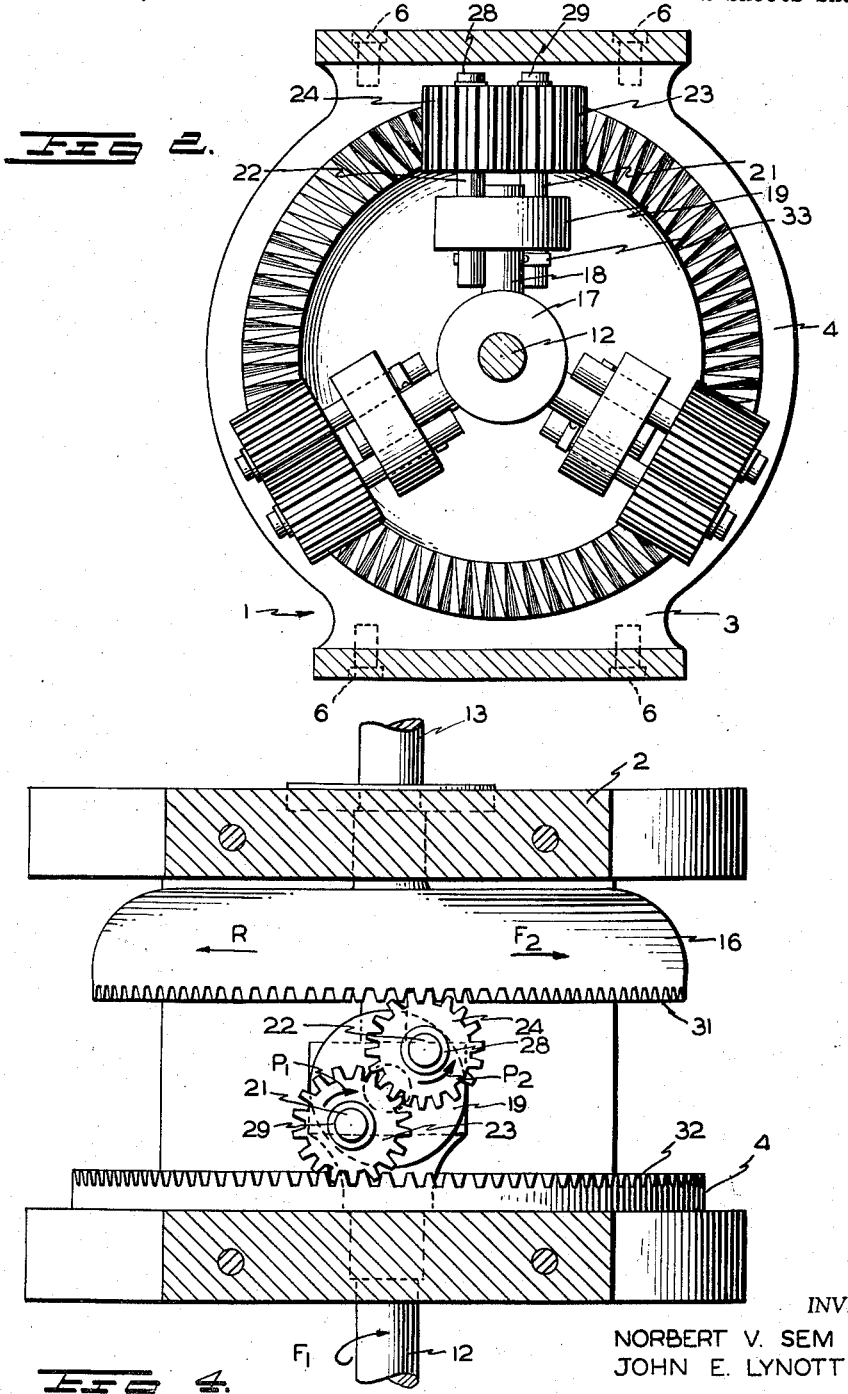

United States Patent Office 2,924,998
Patented Feb. 16, 1960

2,924,998

DIFFERENTIAL GEAR REDUCER

Norbert V. Sem, Milwaukee, Wis., and John E. Lynott, Detroit, Mich., assignors to General Motors Corporation, Detroit, Mich., a corporation of Delaware Application December 31, 1954, Serial No. 479,028

7 Claims. (Cl. 74—801)

This invention relates to a differential speed reducer adapted to produce a constant high torque output. The main object of this invention is to provide a compact differential gear mechanism capable of yielding torque multiplication ratios and consequent speed reduction. Other objects of the subject device include (1) attainment of high torque multiplication either a forward or reverse rotating direction, (2) the availability of selected torque multiplication ratios by the interchange of a single gear member, and (3) provision of a novel planet pinion backlash compensation mechanism. Other objects and advantages will become evident from the following description taken in conjunction with the accompanying drawings in which:

Figure 1 is a longitudinal partition section of one type of gear mechanism embodying our invention.

Figure 2 is a view taken on line 2—2 of Figure 1.

Figure 3 is a view taken on line 3—3 of Figure 1.

Figure 4 is a view taken on line 4—4 of Figure 1.

Figure 5 is a view taken on line 5—5 of Figure 1.

In the drawings like reference characters identify the same parts wherever these parts appear in the different views. Referring to the drawings, the gear mechanism illustrated in Figures 2 and 4 comprises a suitable casing shown generally at 1 and which includes longitudinally spaced bearing support members 2 and 3. The support members 2 and 3 have axially aligned openings therein adapted to respectively receive bearings 8 and 7. The bearings shown in this view are diagrammatically represented and the actual dimensions will be determined in accordance with operational requirements. They may be of different sizes or of the same size. Bearing 8 is retained within the support member 2 by a bearing retainer 11, which in this case is threaded into the opening 10. Bearing 7 is similarly retained in opening 15 by retainer member 9. Bearings 7 and 8 are preferably of the self-aligning type.

A face gear 4 with teeth 32 is integrally formed with or secured to support 3. Support member 3 is removably mounted in casing 1 to allow the substitution of gears with different numbers of teeth for gear 4, as will be further discussed. An input shaft 12 and an output shaft 13 are rotatably supported in bearings 7 and 8, respectively. The input shaft 12 is axially aligned with output shaft 13 and rotatably supported therein by an angular contact bearing 14. The inner end 5 of output shaft 13 is sufficiently larger than the inner end of input shaft 12 to retain bearing 14 in a recessed portion thereof. Radially outward of bearing 14 and integrally formed with or secured to output shaft 13 is an output gear 16 of the face type having teeth 31.

Integrally formed with or secured to the input shaft is a carrier hub 17. One or more pinion supporting posts 18 are radially disposed around carrier hub 17. For convenience three posts are shown disposed on hub 17 at 120° intervals as in Figure 2; however, the number and disposition of posts may be varied in accordance with the use which is to be made of the subject device.

Each pinion support post 18 has rotatably secured thereto a collar 19 which in turn supports planet pinion shafts 21 and 22. Planet pinion gears 23 and 24 are rotatably supported on shafts 21 and 22 by bearings 26 and 27 and retained from outward axial movement by retainers 28 and 29. While miniature bearings, as shown, may be used, the actual bearing size will be determined in accordance with the pinion speed and torque requirements demanded in accordance with the applications of the subject device. Pinion 23 and 24 mesh with each other at a common mesh point preferably lying on the extended axis of post 18. The pinion gears 23 and 24 of each planetary gear set or nest are so arranged that a plane containing the pinion axes will intersect the axis of gear members 4 and 16, as may be visualized in Figure 4. Pinion 24 meshes with teeth 31 of output gear 16. Pinion 23 meshes with teeth 32 of fixed gear 4. In order to accommodate the above-described disposition of pinion gears 23 and 24 and in relation to face gears 4 and 16, the teeth of these face gears are generated with the land 36 of each gear tooth offset from the center C of the gear. This is illustrated in Figure 5 in which the center line of land 36 is shown passing through an offset center O.C.

The tooth lengths of pinions 23 and 24 are sufficient to insure proper meshing characteristics with gears 4 and 16 when gears of a larger or small diameter are substituted for either of these gears. Gears with different numbers of teeth, with consequent change in gear diameter, may be used to obtain different torque multiplication ratios, as explained below.

The speed ratio and direction of speed reduction produced by the mechanism is based on the relationship of the number of output gear teeth to the number of input gear teeth as expressed in the formula $$\text{Reduction ratio} = \frac{N_2}{N_2 - \frac{N_4}{N_3}N_1} = \frac{N_2 N_3}{N_2 N_3 - N_1 N_4}$$

where $N_1$ is the number of teeth 32 on fixed gear 4, $N_2$ is the number of teeth 31 on output gear 16, $N_3$ is the number of teeth on pinion 23, and $N_4$ is the number of teeth on pinion 24.

The following table is an example of the reduction and speed ratios obtainable by changing the number of teeth on removable gear 4, assuming for simplicity that pinions 23 and 24 have the same number of teeth.

| $N_2$ | 92 | 93 | 94 | 95 |
|---|---|---|---|---|
| $N_1$: | | | | |
| 86 | 15⅓ | 13⅔ | 11¾ | 10⅚ |
| 87 | 18⅖ | 15½ | 13¾ | 11⅞ |
| 88 | 23 | 18⅗ | 15⅔ | 13⅘ |
| 89 | 30⅔ | 23¼ | 18⅘ | 15⅚ |
| 90 | 46 | 31 | 23½ | 19 |
| 91 | 92 | 46½ | 31⅓ | 23¾ |
| 92 | X | 93 | 47 | 31⅔ |
| 93 | −92 | X | 94 | 47½ |
| 94 | −46 | −93 | X | 95 |
| 95 | −30⅔ | −46½ | −94 | X |

When the face gears 4 and 16 have the same number of teeth, the output shaft 13 will never rotate regardless of the speed of the input shaft 12. A negative result, as shown in the above table, indicates a reversal of rotation. Thus, when gear 16 has 93 teeth ($N_2$) and fixed gear 4 has 94 teeth ($N_1$) the output gear 16 and output shaft 13 will rotate opposite to the rotation of the input shaft 12 at a speed reduction ratio of 93:1. If each gear has 93 teeth, the output shaft will not rotate. If gear 16 has 93 teeth ($N_2$) and the fixed gear 4 has 92 teeth ($N_1$), the output gear and output shaft will rotate in the same direction as the input shaft at a speed reduction 93:1.

Referring to Figure 4, when gears 23 and 24 have the same number of teeth (e.g. 20) and the gears 4 and 16 have the same number of teeth (e.g. 94), it is evident that when input shaft 12 is rotated as indicated by arrow $F_1$ pinion gears 23 and 24 will rotate as shown by arrows $P_1$ and $P_2$ and output gear 16 will necessarily not rotate in relation to the fixed gear 4, which is secured to casing 1. When fixed gear 4 has more teeth than output gear 16 (e.g. 94 teeth and 93 teeth, respectively), it is evident that gear 16 will rotate in the direction of arrow R at a greatly reduced speed. If fixed gear 4 has less teeth than output gear 16 (e.g. 92 teeth and 93 teeth, respectively), it is evident that output gear 16 will rotate in the direction of arrow $F_2$ at a greatly reduced speed.

Obviously when pinions 23 and 24 do not have the same number of teeth, other sets of ratios than those exemplified in the above table are obtainable, and the design of face gears 31 and 32 would be affected by the $N_3/N_4$ ratio.

Within structural and size limits of the basic differential gear mechanism only the fixed gear 4 need be changed to obtain selected ratios. This change of the fixed face gear may be readily accomplished without disassembly of the transmission. Thus, by changing only one gear, either forward, reverse, or neutral may be obtained. It is obviously possible to use other combinations than those herein presented to obtain similar desired results.

The number of pairs of pinions have to be such that the number of teeth in each face gear is a whole multiple of the number of pinion sets. Therefore the examples given in the above table apply only to a reducer having a single set or pair of pinions. Thus the $N_1/N_2$ ratios of 86 to 92, 90 to 94, etc. would apply to units having two sets of pinions, $N_1/N_2$ ratios of 90 to 93, etc. to units having three sets of pinions, as shown in Figure 2, and similar limitations are applicable to other numbers of pinion sets which may be used. As a result, the maximum reduction ratio can never be greater than $N_2/N_5$, where $N_5$ is the number of pinion sets, and consequently a single set of pinions will provide the maximum reduction as well as the greatest number of possible reduction ratios.

This type mechanism is particularly desirable when a constant torque multiplication ratio is desired over long periods with a wide range of other torque multiplication ratios readily available with the change of a single gear member as noted above.

It should be noted that the term "face gear" has been used instead of the term "crown gear." Technically, a crown gear is one species of a bevel gear and meshes with a bevel type pinion, while a face gear meshes with an external spur type pinion gear. In addition, a face gear has teeth which decrease in thickness with an increase in radial distance from the rotational axis of the gear, as shown by Figure 5. The converse is true with respect to a crown type bevel gear, i.e., the tooth thickness increases with an increase in the radial distance.

Backlash is provided in toothed gear mechanisms to care for the inaccuracies in the form and spacing of the teeth and in the mounting of the gears. The adjustment of the distance between the pitch circles of meshing gears to provide for the best backlash characteristics is referred to as backlash compensation. The provision of a simple, light weight and durable backlash compensation mechanism with automatic adjustment, as in the instant device, is desirable.

Backlash compensation can be provided easily by spring loading each pair of pinion gears about their common mesh point in such a way that they are constantly trying to push the two face gears farther apart. Backlash compensation is here obtained by use of biasing element 33. This provides a simple, positive and effective biasing element which is easily assembled, subject to no disarrangement due to transmission loads or shocks, and is readily exchanged as needed. The element is shown in the drawings as two leaf springs which respectively contact pinion shafts 21 and 22. They are secured to post 18 in a suitable manner, such as by screws 34. The biasing element tends to rotate the collar assembly around the axis of post 18, thus forcing continuous engagement of the pinions 23 and 24 with gears 14 and 16 by constantly trying to push the two latter gears farther apart. One or more springs may be utilized and two are shown by way of example. Other types of biasing means such as a torsion spring or unitary leaf spring with either end biased against a pinion shaft may be used. Such a spring may be suitably inserted in post 18 to provide proper anchorage.

What is claimed is:

1. In a differential gear mechanism having in combination axially aligned input and output shafts, a pair of axially spaced gear members concentrically disposed with respect to said shafts, means for removably fixing one of said gear members against rotation and allowing said one gear member to be replaced by a gear member having more or less teeth than the other gear member, a plurality of pinion gear sets disposed intermediate said gear members, each pinion gear set including a pair of meshing pinion gears, one pinion gear of each set meshing with one of said gear members and the other pinion gear meshing with the other of said gear members, and means for supporting said pinion gear sets upon one of said shafts so that the rotative axis of each pinion is normal and askew to the axis of the input and output shafts, the non-fixed gear member being mounted for rotation with said other shaft.

2. A differential gear mechanism having two axially spaced and aligned gear members, a plurality of pinion gear sets disposed intermediate said gear members and rotatably supported on axes normal to the common axis of said gear members, a pair of pinion gears in each set, said pinion gears meshing with each other and rotatably supported on shafts spaced from but axially parallel to the axes of said pinion gear sets, each of said gear members meshing with one of said pinion gears of said sets, a carrier for said sets, an input shaft and an output shaft, said carrier being secured to one of said shafts for rotation therewith, one of said gear members being mounted on the other of said shafts, the other of said gear members being a reaction member, and backlash compensation means for urging each pinion gear set to rotate around its axis, causing said pinion gears to maintain meshing engagement with said gear members, said pinion gears being so arranged that a plane containing the pinion gear axes of each pinion gear set will intersect the axis of said gear members.

3. In a differential gear mechanism having in combination axially aligned input and output shafts, a pair of axially spaced gear members concentrically disposed with respect to said shafts, means for fixing one of said gear members against rotation, the other gear member being mounted for rotation with one of said shafts, a plurality of planetary gear sets positioned intermediate said gear members, each planetary gear set including a pair of meshing pinion gears, one pinion gear of each set meshing with one of said gear members and the other pinion gear of each set meshing with the other of said gear members, means for supporting said pinion gear sets upon said other shaft, said last-named means including radially disposed support members and a collar rotatably mounted thereon, and means for backlash compensation between the pinion gears and the respective gear members.

4. In a gear mechanism comprising axially aligned input and output shafts, axially spaced face gear members, one face gear member being mounted for rotation with one of said shafts, the other face gear member being fixed against rotation, a carrier secured to and rotatable with the other of said shafts, and a plurality of planet pinions mounted for rotation thereon, said pinions and said shafts having normal and non-intersecting axes, half the number of said pinions meshing with one of said face gear members and the remainder of said pinions meshing with the other of said gear members, the fixed face gear member being removable to allow substitution of other face gear members with different numbers of teeth thereon.

5. In a gear mechanism the combination of a plurality of pinion gear sets, a pair of pinion gears in each set, said pinion gears meshing with each other, a pair of axially aligned gear members, one of said gear members meshing with one pinion gear of each of said pinion gear sets, the other of said gear members meshing with the other pinion gear of each of said pinion gear sets, a carrier in axial alignment with and positioned intermediate said gear members, a plurality of support members extending radially from said carrier, a collar rotatably mounted on and concentric with each of said support members, a plurality of pinion shafts secured to each of said collars and in axially parallel relation with said support members, said pinion gears being rotatably mounted on and limited in radial movement in relation to said pinion shafts, said pinion gears of each pinion gear set being so arranged that a line through the extended axes of said pinion shafts will intersect the axis of said gear members, forming an acute angle therewith, and biasing means tending to cause rotation of said collar about said support members in a direction to decrease said acute angle.

6. A gear mechanism comprising a stationary housing, axially aligned input and output shafts rotatably supported on said housing, a pair of axially spaced gear members concentrically disposed with respect to said shafts, means for removably fixing one of said gear members to said housing and permitting a gear member having more or less teeth than the other gear member to be substituted therefor, the other of said gear members being mounted for rotation with one of said shafts, pinion support members, means for connecting said support members to the other of said shafts for rotation therewith, a plurality of pinion gear sets disposed intermediate said gear members and rotatably supported by said pinion support members on axes normal and askew to the axis of said gear members, each pinion gear set including a pair of meshing pinion gears of equal tooth length, one pinion gear of each set meshing with one of said gear members and the other pinion gear of each set meshing with the other of said gear members, and means for biasing said pinion gears into meshing engagement with the respective gear members.

7. A gear mechanism comprising meshing planetary pinions, first and second gear members respectively meshing with said pinions, a carrier, means for mounting said pinions on said carrier, and yielding means mounted on said carrier and engaging said pinion mounting means to constantly urge said pinions into meshing engagement with the respective gear members to provide backlash compensation.

References Cited in the file of this patent

UNITED STATES PATENTS

| 426,524 | Clough et al. | Apr. 29, 1890 |
| 1,246,155 | Pillmore | Nov. 13, 1917 |
| 1,987,674 | Ford | Jan. 15, 1935 |
| 2,213,379 | Bird | Sept. 3, 1940 |
| 2,313,183 | Trbojevich | Mar. 9, 1943 |
| 2,479,465 | Boeck et al. | Aug. 16, 1949 |
| 2,570,151 | Peterson | Oct. 2, 1951 |
| 2,735,310 | McFarland | Feb. 21, 1956 |

FOREIGN PATENTS

| 17,443 | Great Britain | Aug. 29, 1905 |
| 717,517 | Germany | Feb. 16, 1942 |
| 867,200 | Germany | Feb. 16, 1953 |
| 1,033,053 | France | Apr. 1, 1953 |